(12) United States Patent
Shimkonis

(10) Patent No.: US 11,686,433 B2
(45) Date of Patent: Jun. 27, 2023

(54) COLLAPSIBLE FLUID COLLECTION CONTAINER

(71) Applicant: Joseph Dennis Shimkonis, Honolulu, HI (US)

(72) Inventor: Joseph Dennis Shimkonis, Honolulu, HI (US)

(*) Notice: Subject to any disclaimer, the term of this patent is extended or adjusted under 35 U.S.C. 154(b) by 143 days.

(21) Appl. No.: 17/302,519

(22) Filed: May 5, 2021

(65) Prior Publication Data
US 2021/0381642 A1 Dec. 9, 2021

Related U.S. Application Data

(60) Provisional application No. 62/704,928, filed on Jun. 3, 2020.

(51) Int. Cl.
*B01D 35/28* (2006.01)
*B60S 5/00* (2006.01)
*F16N 31/00* (2006.01)
*B65D 21/08* (2006.01)
*B65D 77/06* (2006.01)
*B65D 33/08* (2006.01)
(Continued)

(52) U.S. Cl.
CPC .......... *F16N 31/004* (2013.01); *B01D 35/005* (2013.01); *B01D 35/027* (2013.01);
(Continued)

(58) Field of Classification Search
CPC ... F16N 31/004; B01D 35/005; B01D 35/027; B01D 35/28; B01D 2201/301; B01D 2201/31; B01D 2201/4092; B01D 29/03; B60S 5/00; B65D 21/086; B65D 33/08; B65D 77/062
(Continued)

(56) References Cited

U.S. PATENT DOCUMENTS 3,119,543 A 1/1964 Walker
3,874,478 A 4/1975 Mantell, Jr.
(Continued)

FOREIGN PATENT DOCUMENTS

AU 2006258730 B2 12/2006
GB 2288584 A 10/1995
GB 2402924 B 8/2006

OTHER PUBLICATIONS

International Search Report and Written Opinion; PCT/US21/70549; dated Sep. 29, 2021.

*Primary Examiner* — Madeline Gonzalez
(74) *Attorney, Agent, or Firm* — Dunlap Bennett & Ludwig, PLLC; Anna L. Kinney

(57) ABSTRACT

A fluid collection container includes a self-supporting, collapsible bag with a threaded cylindrical inlet ring or spout and a strainer removably seated within the ring. The strainer can separate a macroscopic solid object from a viscous liquid. The fluid collection container includes a rectangular prismatic box with the spout extending through and a threaded cap removably coupled to the spout. A method of draining automotive oil includes positioning the bag beneath an oil pan of an automobile, removing an oil plug from the automotive oil pan and allowing the oil plug to fall into the strainer; draining the automotive oil through the strainer into the bag; removing an oil filter from the automobile; removing the strainer from the inlet; inserting the oil filter; and screwing a threaded the cap onto the inlet.

2 Claims, 9 Drawing Sheets

(51) Int. Cl.
*B01D 35/00* (2006.01)
*B01D 35/027* (2006.01)

(52) U.S. Cl.
CPC ............... *B01D 35/28* (2013.01); *B60S 5/00* (2013.01); *B65D 21/086* (2013.01); *B65D 33/08* (2013.01); *B65D 77/062* (2013.01); *B01D 2201/301* (2013.01); *B01D 2201/31* (2013.01); *B01D 2201/4092* (2013.01)

(58) Field of Classification Search
USPC ........ 210/767, 232, 307, 470, 473, DIG. 17, 210/248, 244, 238, 416.5; 141/88, 114
See application file for complete search history.

(56) References Cited

U.S. PATENT DOCUMENTS

| | | |
|---|---|---|
| 4,020,922 A | 5/1977 | Klasel |
| 4,022,257 A | 5/1977 | OConnell |
| 4,054,184 A | 10/1977 | Marcinko |
| 4,064,969 A | 12/1977 | Black |
| 4,098,398 A | 7/1978 | Meyers |
| 4,283,032 A | 8/1981 | Smith |
| 4,442,936 A | 4/1984 | Densham |
| 4,610,039 A | 9/1986 | Stern |
| 4,756,349 A | 7/1988 | Atkins |
| 5,121,776 A | 6/1992 | Kovach |
| 5,203,470 A | 4/1993 | Brown |
| 5,314,088 A | 5/1994 | Heuberger et al. |
| 5,454,960 A | 10/1995 | Newsom |
| 5,623,755 A * | 4/1997 | Childress ............... F16N 31/002 210/248 |
| 5,630,451 A | 5/1997 | Bernard |
| 6,245,228 B1 | 6/2001 | Kelada |
| 7,815,800 B2 | 10/2010 | Komatsu |
| 7,913,721 B2 | 3/2011 | Henecke |
| 2003/0062221 A1 | 4/2003 | Burrow et al. |
| 2005/0224292 A1 | 10/2005 | Rubang |
| 2017/0232369 A1 | 8/2017 | Cardones et al. |

* cited by examiner

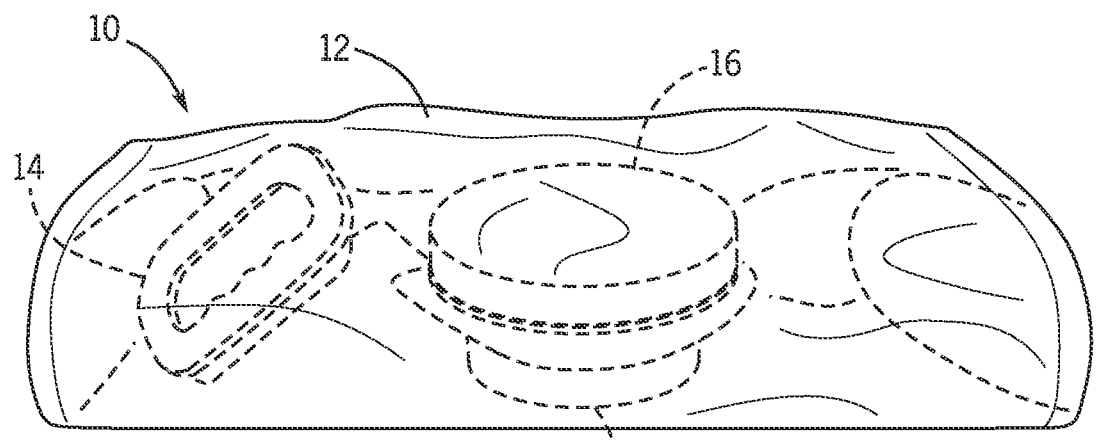
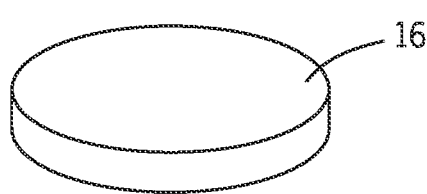
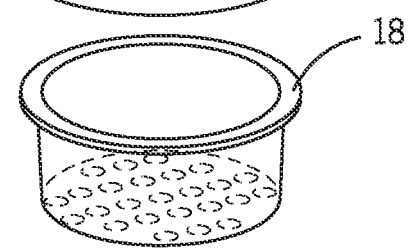
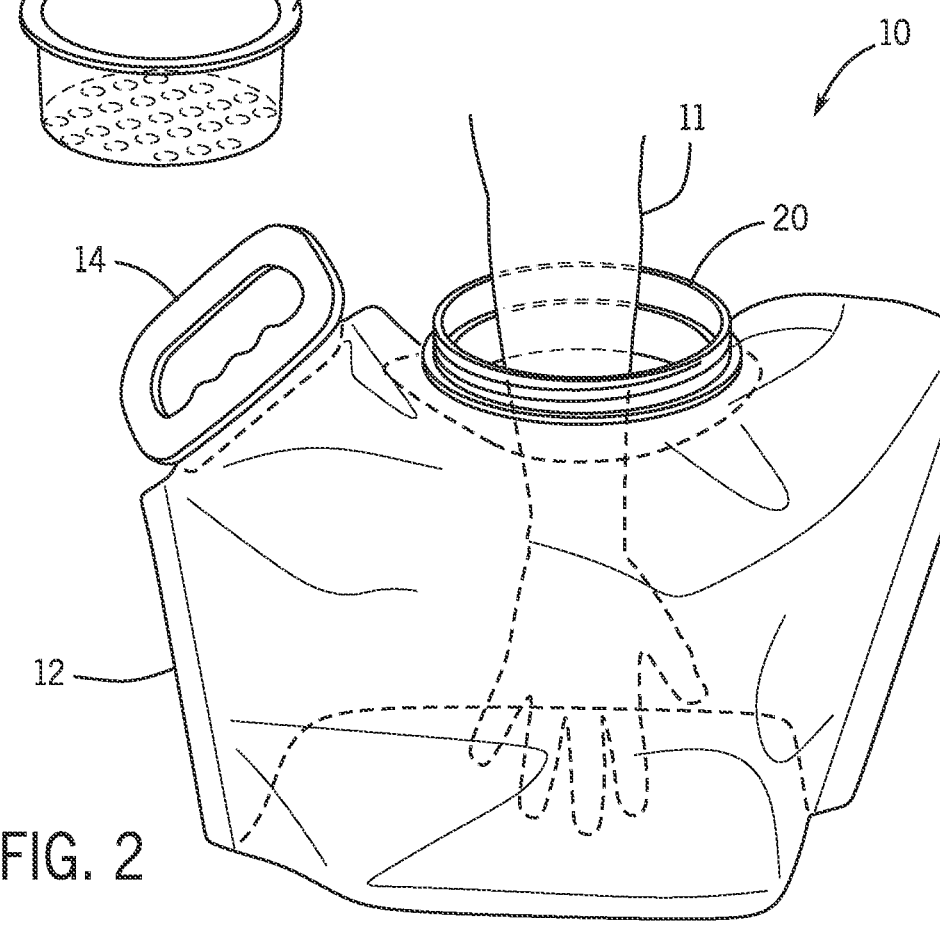

COLLAPSIBLE FLUID COLLECTION CONTAINER

CROSS-REFERENCE TO RELATED APPLICATION

This application claims the benefit of priority of U.S. provisional application No. 62/704,928, filed Jun. 3, 2020, the contents of which are herein incorporated by reference.

BACKGROUND OF THE INVENTION

The present invention relates to a fluid collection container and, more particularly, to a collapsible container for collection of motor oil.

Existing oil collection containers are bulky, complex, and impractical for people who change their own engine's oil. Existing devices do not capture an engine's drain plug in a compact manner. Most, if not all of them, do not expand when a liquid enters its cavity. Moreover, existing containers may leak when sealed and do not promote a viable means to recycle used engine oil easily.

As can be seen, there is a need for a simple device for collection of used engine oil.

SUMMARY OF THE INVENTION

The present invention provides a collapsible bag that may fold into itself for easy storage. When unfolded and placed under a motor vehicle as the oil pan drains, the bag may self-expand due to the weight of the viscous liquid. An inner threaded ring and sieve component allows motor oil to flow through easily while capturing an engine's drain plug. The inventive bag is compact and inexpensive to manufacture, making it affordable for the average consumer. The present invention is advantageously less bulky than other oil collection devices, easily transported, simple, and easy to use.

In one aspect of the present invention, a fluid collection container is provided, comprising: a self-supporting, collapsible bag with a threaded cylindrical inlet ring and a strainer removably seated within the threaded cylindrical inlet ring, said strainer being operative to separate a macroscopic solid object from a viscous liquid.

In another aspect of the present invention, a fluid collection container is provided, comprising: a rectangular prismatic box; a collapsible, self-supporting fluid collection bag having a threaded cylindrical spout extending through an aperture in the box; a strainer removably resting within the threaded cylindrical spout; and a threaded cap removably coupled to the threaded cylindrical spout.

In another aspect of the present invention, a method of draining automotive oil is provided, comprising: positioning a self-supporting, collapsible bag beneath an oil pan of an automobile, said self-supporting, collapsible bag having a threaded inlet with a strainer removably seated therein; removing an oil plug from the automotive oil pan and allowing the oil plug to fall into the strainer; draining the automotive oil through the strainer into the self-supporting, collapsible bag; removing an oil filter from the automobile; removing the strainer with the oil plug therein from the threaded inlet; inserting the oil filter through the threaded inlet; and screwing a threaded cap onto the threaded inlet.

These and other features, aspects and advantages of the present invention will become better understood with reference to the following drawings, description, and claims.

BRIEF DESCRIPTION OF THE DRAWINGS

FIG. 1 is a perspective view of an oil change bag according to an embodiment of the present invention, shown in a collapsed condition;

FIG. 2 is an exploded perspective view thereof, shown in an expanded condition;

DETAILED DESCRIPTION OF THE INVENTION

Figure 3:
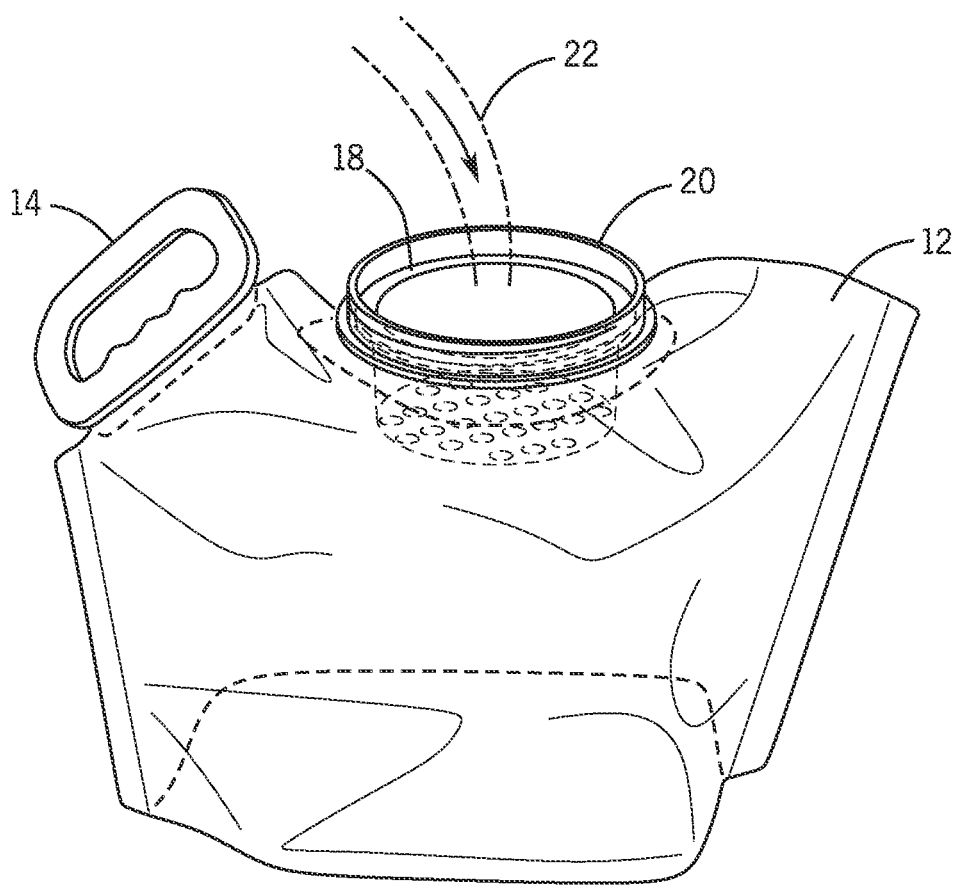
FIG. 3 is a perspective view thereof, shown in use during filling.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is a collapsible fluid collection container comprising a bag, a threaded mouth or inlet ring, a sieve or strainer, and a threaded cap. The inventive device is easily collapsible, easily expanded without complexity, and may be easily and safely carried with a handle. The inventive container is not limited to use with motor oil and may be used to capture and transport any liquid, such as to collect vegetable oil. Moreover, the sieve may be used to filter any liquid and to extract foreign objects from contaminated fluids, such as fuel. The sieve is advantageously operative to capture the drain plug when motor oil is drained into the device.

The inner ring, mouth, or spout of the bag and the sieve allow oil to flow into the bag without hindrance. The sieve is effective to capture an engine oil pan drain plug without obstructing oil flow into the bag. The sieve perforations or apertures may be, but are not limited to, selected from the group consisting of round, square, rectangular, and triangular. The perforations may be symmetrical or asymmetrical.

The threaded mouth allows the filled bag to be sealed with the threaded cap so it can be transported to a recycling facility.

In some embodiments, the collection bag may be formed with one or more handles.

In some embodiments, the collection bag is provided with a large spout and a removable/disposable sieve. The threaded ring may also serve as a spout that may be capped shut with a screwable cap, for example to seal used oil within the collection bag for transporting it to a recycle center. The spout or threaded ring may have an inner lip that supports the sieve. Alternatively, the sieve may be provided with an external ledge that rests on the spout. The sieve may be removed to expand the bag to accept used engine oil. Once the opening is sealed, the bag may be carried to a recycle center.

In some embodiments, the bag may be self-standing or self-supporting. In other words, the bag maintains its structure without additional support. No supporting device is necessary. The bag may self-support even when expanded to a height less than the bag's maximum height, advantageously allowing the bag to be used regardless of available clearance. The self-standing bag generally comprises a sieve to capture the engine drain plug.

In some embodiments, an additional permeable trap component may be provided to capture an engine's drain plug. The permeable trap not only allows oil to flow freely; it may also serve as a tool to catch an oil drain plug.

In some embodiments, the cap comprises a collapsible spout and/or a valve.

In some embodiments, the plastic bag may be fused to an extruded, 3-dimensionally (3d) printed, or injection molded plastic spout, for example, by way of heat or by a gluing process.

In some embodiments, the sieve may be configured in the form of a perforated cup. In other embodiments, the sieve may be provided in the form of a perforated disc or coaster. In some cases, the disc-shaped sieve may enable a tighter seal between the cap and the threaded ring.

In some embodiments, the oil filter may also be recycled with the oil. The user may place the filter inside the bag before or after draining the oil.

In some embodiments, the bag is provided inside a box, such as an auto bottom box or a snap lock box. The box may be attached to the bag at the inlet ring. In some cases, the bag may be adhered to the interior of the box, such as with an adhesive. In other embodiments, the bag may be placed inside a box for easy storage and transport. The box may have one or more handles.

In some embodiments, the self-supporting bag may be provided as a kit with a separate box. Once the bag is filled, it may be placed into the box. The box may be sealed shut for transport to a recycling center. Multiple boxes may be stacked for easy transport and for storage.

The materials of manufacture are not particularly limited. The components may be manufactured of any suitable material, such as various polymeric materials. The bag may be manufactured from a material such as plastic, foil, paper, and a combination thereof. Preferably, the bag material is resistant to degradation by the fluid to be collected, e.g., the bag is oil resistant. The bag and handle(s) may be unitary, i.e., formed together as one unit from, for example, blown extruded plastic. For example, the handles may be cut out of the bag material. The inner ring and sieve may be made of a rigid or flexible molded material, around which the mouth of the bag may be stretched or heat shrunk. The box may be made, for example, of cardboard or plastic, which may, for example, have a rectangular prism shape.

A method of using the inventive fluid container may have the following steps. The bag may be removed from a small retail package in which it has been packed in a collapsed condition and may be expanded by removing the sieve and placing a hand inside the bag through the spout. Once the sieve has been reinserted in the spout, the device may be positioned under an automobile engine to capture used engine oil.

Figure 4:
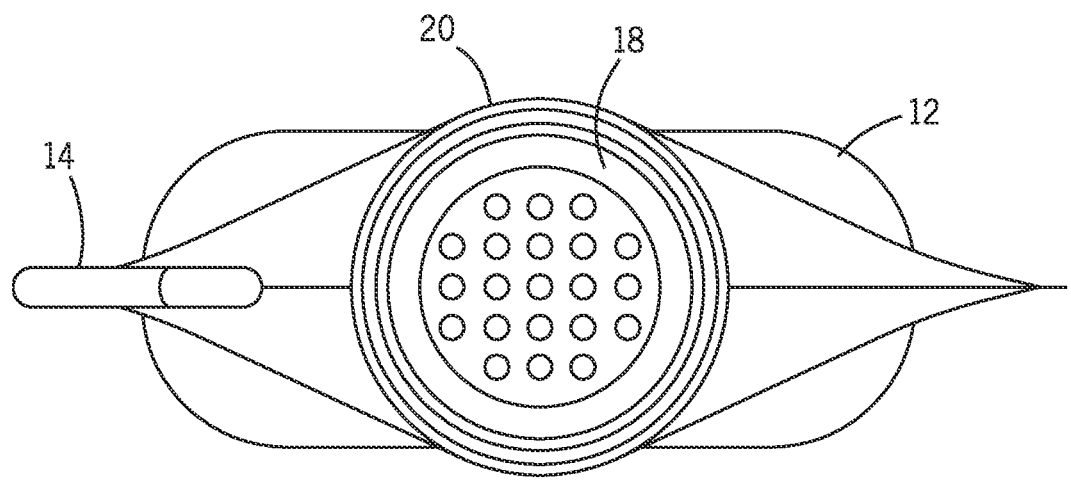
FIG. 4 is a top plan view thereof, shown in a filled condition.
Figure 5:
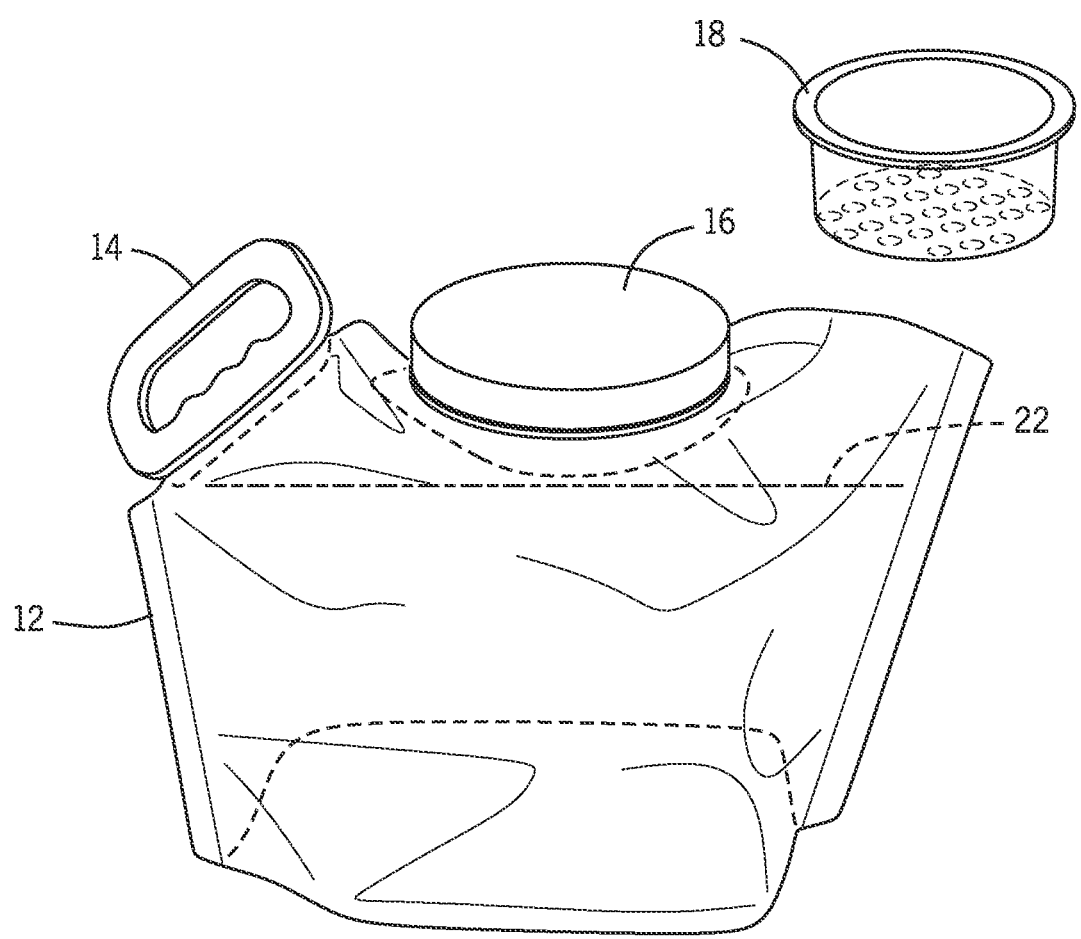
FIG. 5 is a partially exploded perspective view thereof.

Referring to FIGS. 1 through 17, FIGS. 1 through 5 show an oil change and recycling container 10 according to a first embodiment of the invention. FIG. 1 shows the container 10 in a collapsed configuration or condition. FIG. 2 illustrates a method of expanding the self-supporting, collapsible bag 12 for use by inserting the user's hand 11 through the threaded opening 20 and into the bag 12 after the threaded cap 16 and sieve 18 have been removed. The handle 14 makes the container 10 much easier to carry. As shown in FIG. 3, the container 10 may be used by draining oil 22 through the sieve 18 into the bag 12 until the bag 12 is full to a predetermined level. FIG. 4 illustrates a full bag 12 uncapped and FIG. 5 shows the threaded opening 20 sealed with the threaded cap 16, with the sieve 18 removed, ready for transport to a recycling facility.

Figure 6:
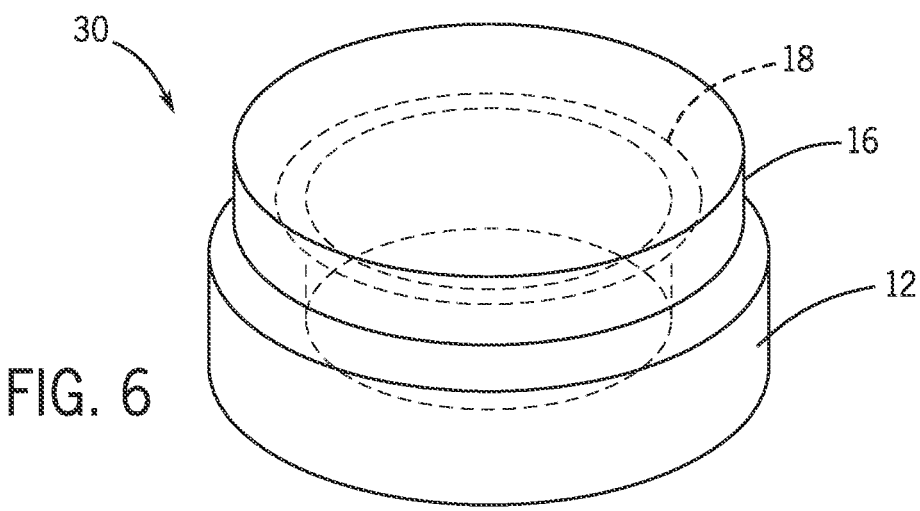
FIG. 6 is a partial perspective view of a portion of an oil change bag according to another embodiment of the present invention.
Figure 7:
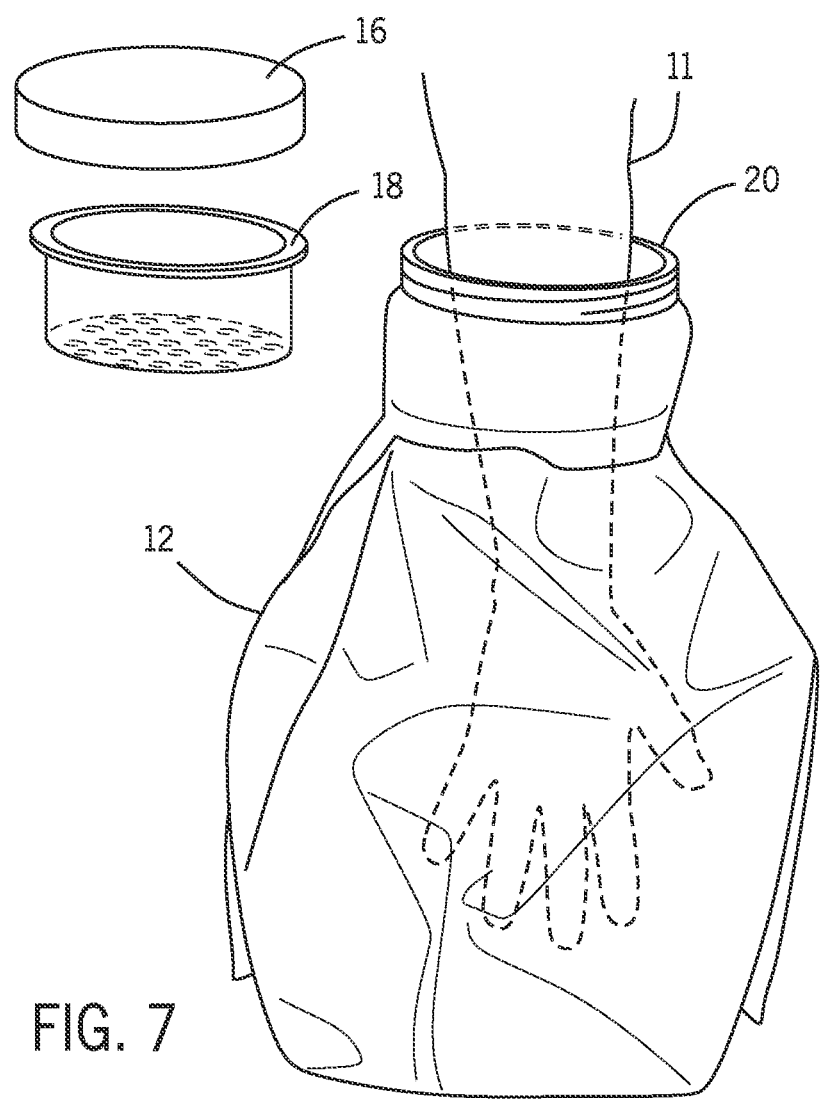
FIG. 7 is an exploded perspective view thereof, shown in an expanded condition.
Figure 8:
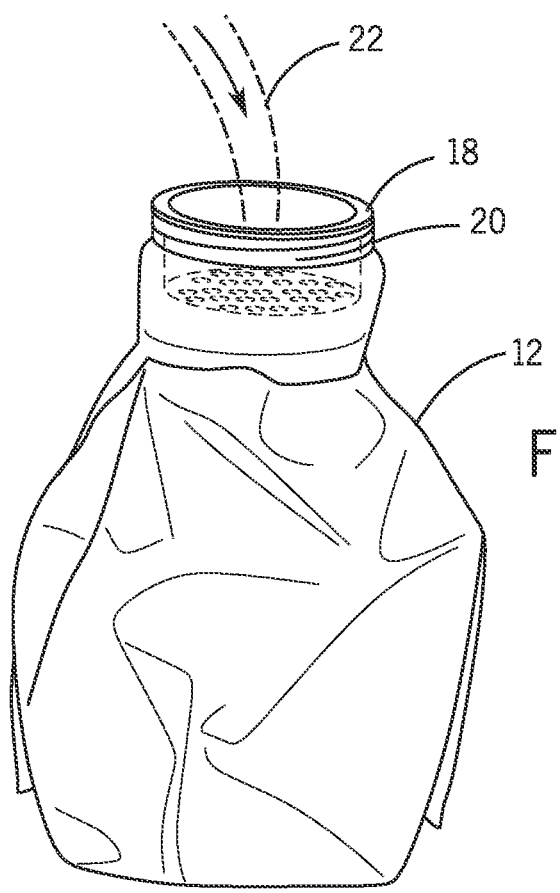
FIG. 8 is a perspective view thereof, shown in use during filling.
Figure 9:
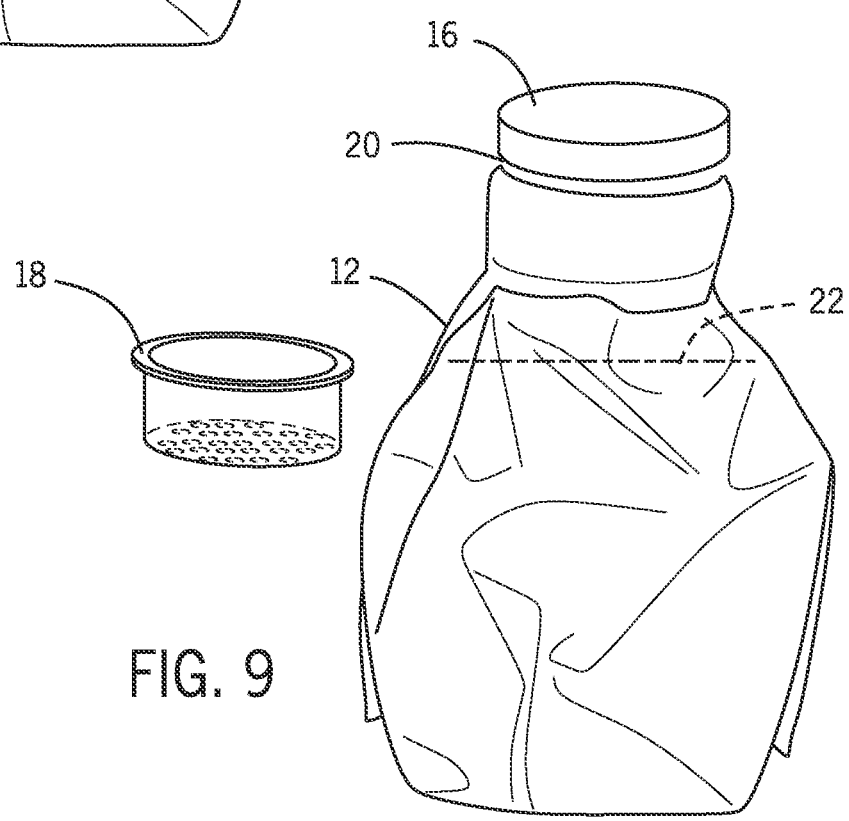
FIG. 9 is a perspective view thereof, shown in a filled condition.
Figure 10:
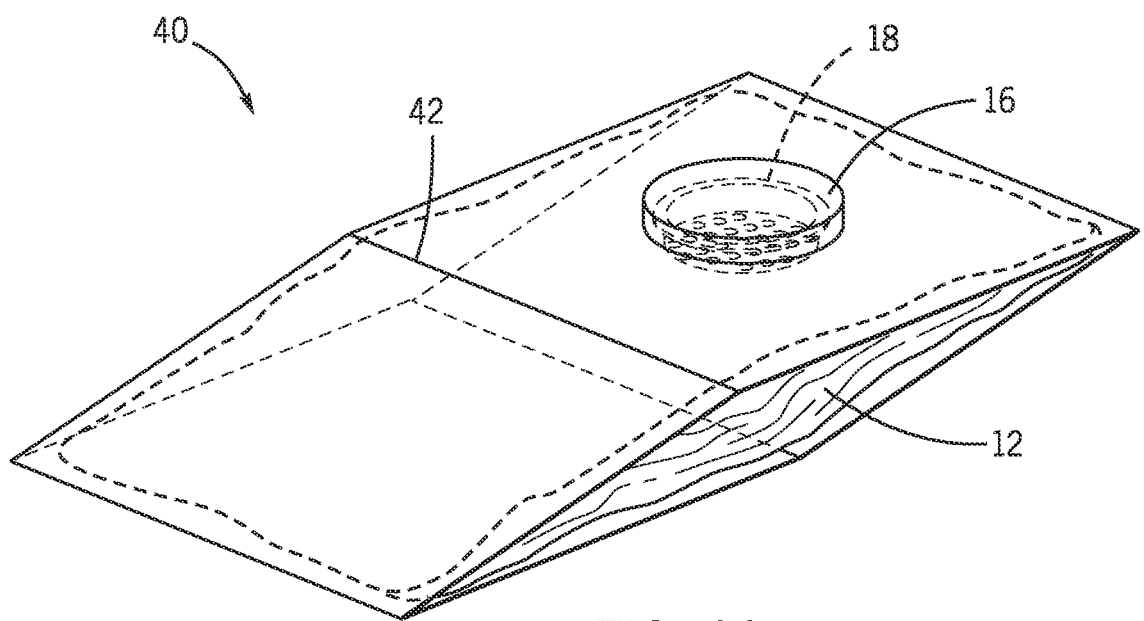
FIG. 10 is a perspective view of a boxed oil change bag according to another embodiment of the present invention, shown in a collapsed condition.

FIGS. 6 through 9 show an oil change and recycling container 30 according to a second embodiment. FIG. 6 shows a partial view of the oil change and recycling container 30, with the sieve 18 hidden under the threaded cap at an opening of the bag 12. The bag 12 may be expanded by inserting the user's hand 11 through the threaded opening 20 after the threaded cap 16 and sieve 18 have been removed, as shown in FIG. 7. As shown in FIGS. 8 and 9, oil 22 may be drained through the sieve 18 and the container 30 may be capped 16 for storage and transport once the sieve 18 has been removed.

Figure 11:
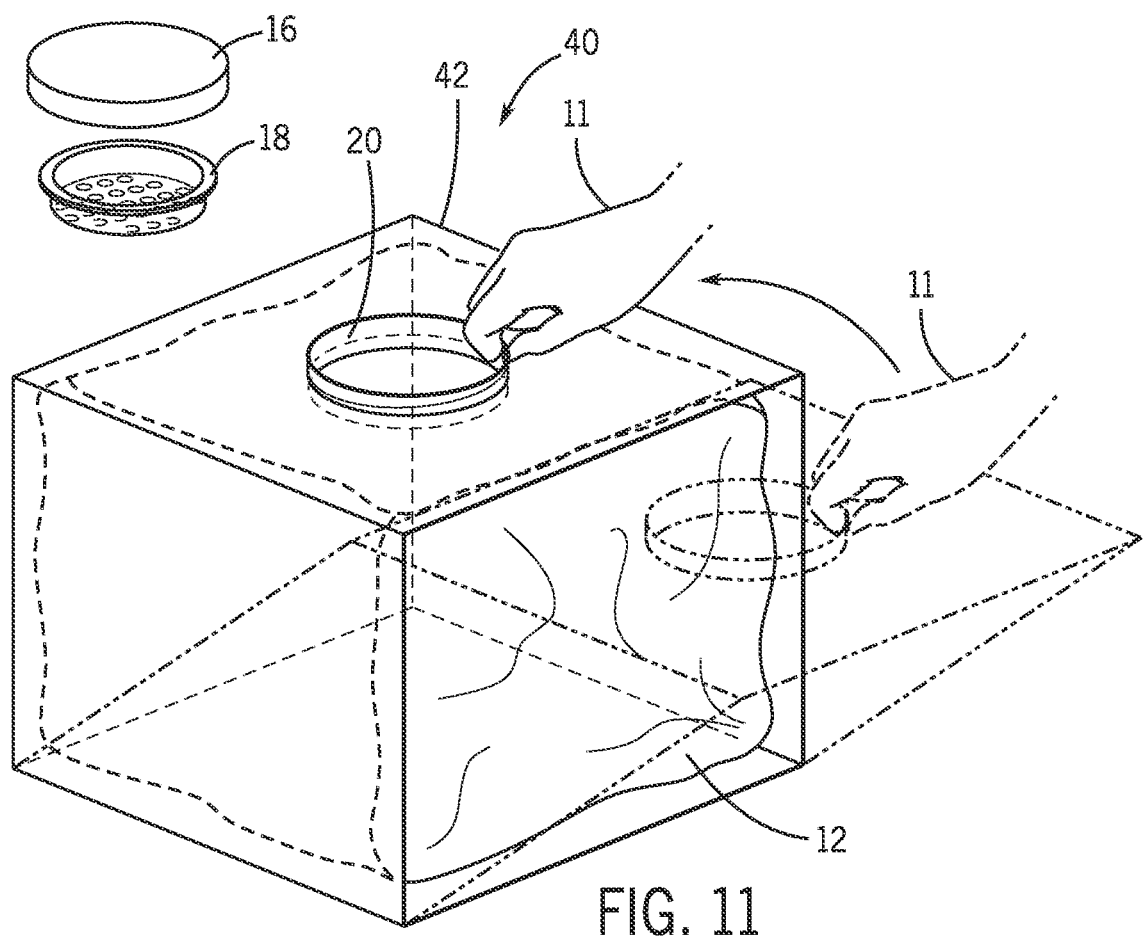
FIG. 11 is an exploded perspective view thereof, shown in an expanded condition.
Figure 12:
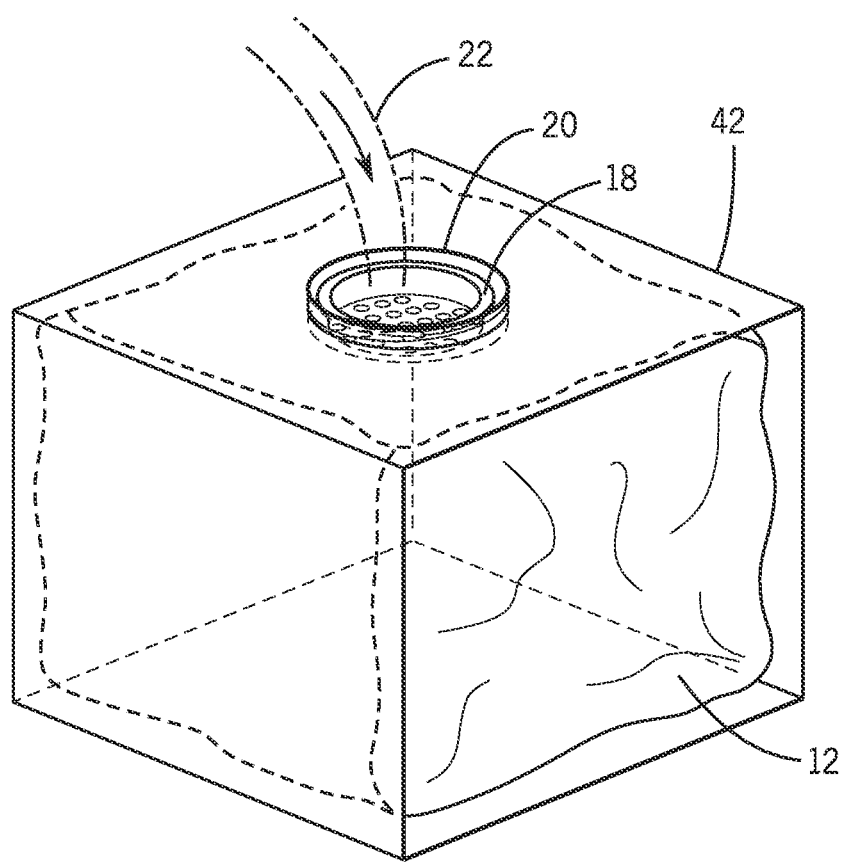
FIG. 12 is a perspective view thereof, shown in use during filling.
Figure 13:
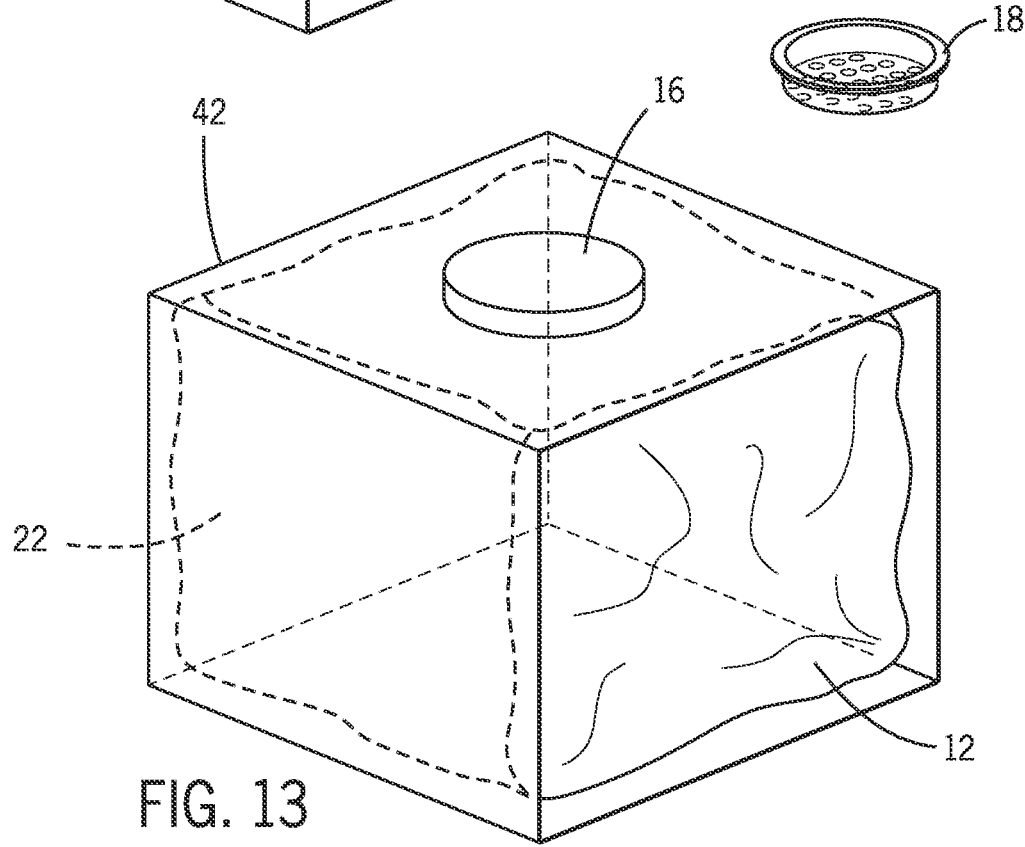
FIG. 13 is a perspective view thereof, shown in a filled condition.
Figure 14:
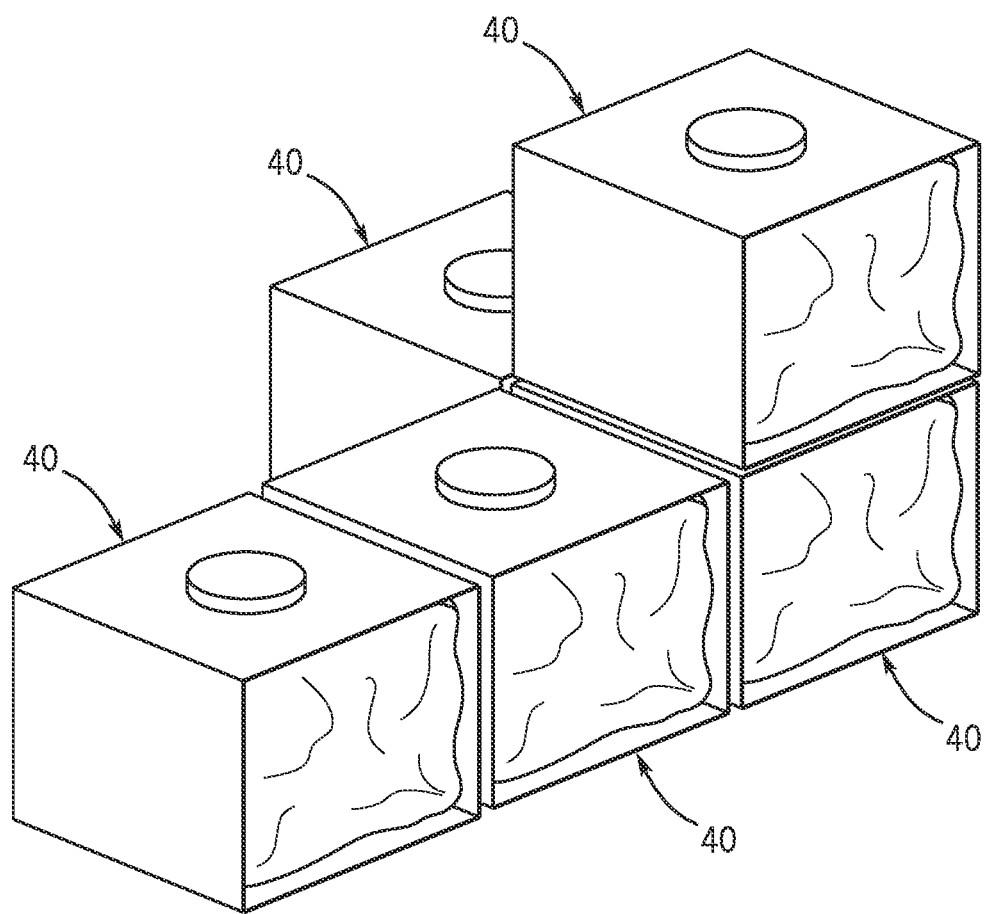
FIG. 14 is a perspective view thereof, shown with additional containers in a stacked configuration.

FIGS. 10 through 14 show an oil change and recycling container 40 according to a third embodiment. The container 40 includes a collapsible box 42 surrounding an oil collection bag 12 secured therein. The container 40 may be expanded by raising inserting the user's hand 11 and raising the threaded opening 20, as shown in FIG. 11. As shown in FIGS. 12 and 13, oil 22 may be drained through the sieve 18 into the bag 12 until filled to a predetermined level. The sieve 18 may be removed and the cap 16 may be installed onto the threaded opening 20 for storage and transport. The box 42 enables the user to stack several containers 40 as shown in FIG. 14.

Figure 15:
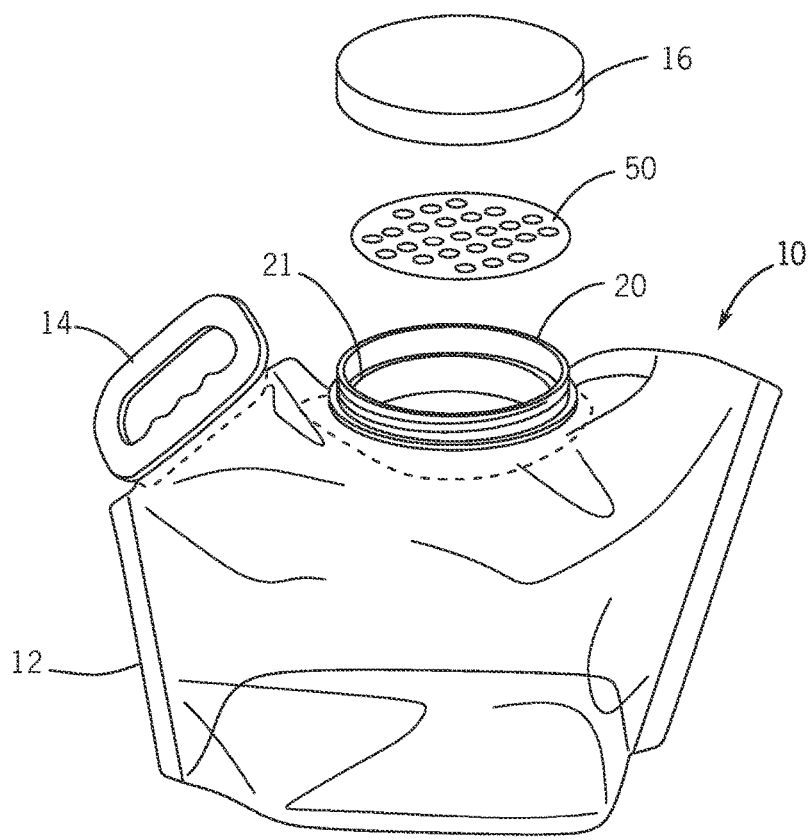
FIG. 15 is an exploded perspective view of another embodiment of the present invention.
Figure 16:
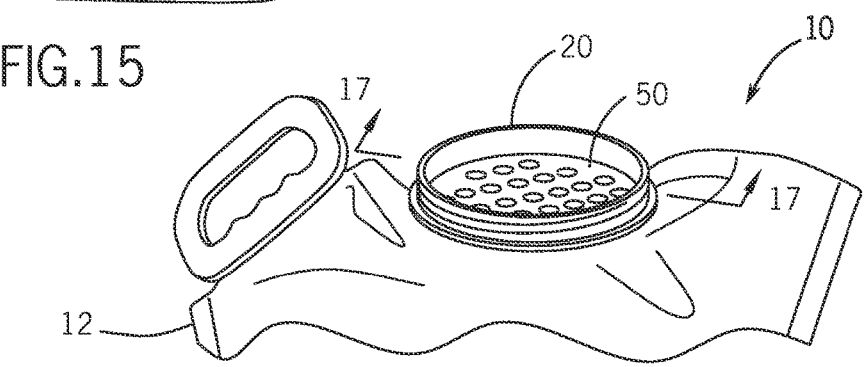
FIG. 16 is a detail perspective view thereof.
Figure 17:
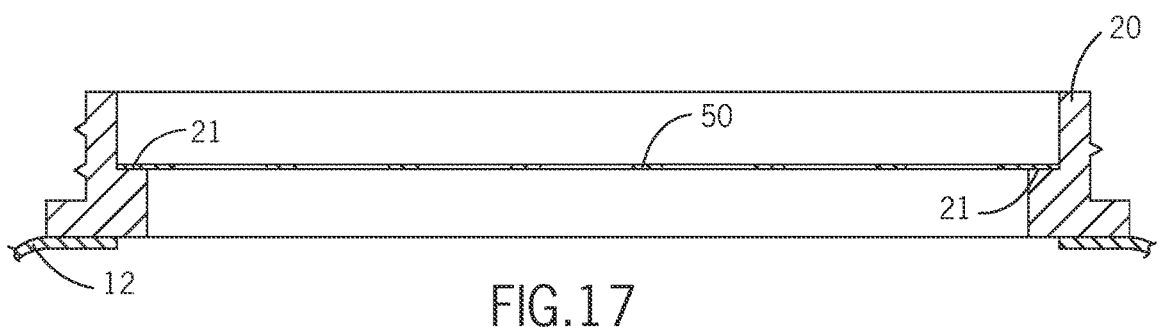
FIG. 17 is a sectional view thereof, taken along line 17-17 in FIG. 16.

FIGS. 15 through 17 show an oil change and recycling container 10 according to a fourth embodiment. The container 10 has a lip 21 or ledge extending from the inner surface of the threaded opening 20 that supports a disc strainer 50.

It should be understood, of course, that the foregoing relates to exemplary embodiments of the invention and that modifications may be made without departing from the spirit and scope of the invention as set forth in the following claims.

What is claimed is:

1. A method of draining automotive oil, comprising:
   a) positioning a self-supporting, collapsible bag beneath an oil pan of an automobile, said self-supporting, collapsible bag having a threaded inlet with a strainer removably seated therein;
   b) removing an oil plug from the oil pan and allowing the oil plug to fall into the strainer;

c) draining oil through the strainer into the self-supporting, collapsible bag;
d) removing an oil filter from the automobile;
e) removing the strainer with the oil plug therein from the threaded inlet;
f) inserting the oil filter through the threaded inlet; and
g) screwing a threaded cap onto the threaded inlet.

2. The method of claim 1, further comprising removing the strainer from the threaded inlet and reinserting the strainer into the threaded inlet before removing the oil plug from the oil pan, wherein the steps of removing the oil filter from the automobile and inserting the oil filter through the threaded inlet precede reinserting the strainer into the threaded bag inlet.

\* \* \* \* \*